US007908910B2

(12) United States Patent
Tanaya

(10) Patent No.: US 7,908,910 B2
(45) Date of Patent: Mar. 22, 2011

(54) COMBUSTION STATE DETECTING APPARATUS FOR INTERNAL COMBUSTION ENGINE

(75) Inventor: Kimihiko Tanaya, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 43 days.

(21) Appl. No.: 12/478,101

(22) Filed: Jun. 4, 2009

(65) Prior Publication Data

US 2010/0101313 A1 Apr. 29, 2010

(30) Foreign Application Priority Data

Oct. 29, 2008 (JP) ................................. 2008-277763

(51) Int. Cl.
*G01M 15/04* (2006.01)

(52) U.S. Cl. ................ 73/114.08; 73/114.62; 73/114.67

(58) Field of Classification Search ............... 73/114.08, 73/114.62, 114.67
See application file for complete search history.

(56) References Cited

U.S. PATENT DOCUMENTS 5,144,936 A * 9/1992 Murata et al. ................. 123/655
5,561,239 A * 10/1996 Yasuda ........................ 73/35.08
5,675,072 A * 10/1997 Yasuda et al. ................ 73/35.08
5,781,012 A * 7/1998 Yasuda ......................... 324/399
5,970,952 A * 10/1999 Mogi et al. ............... 123/406.27
6,011,397 A * 1/2000 Yasuda ......................... 324/388
6,075,366 A * 6/2000 Yasuda ......................... 324/380
6,202,474 B1 * 3/2001 Takahashi et al. ........... 73/35.08
7,164,271 B2 * 1/2007 Ando ........................... 324/380
7,467,626 B2 * 12/2008 Naruse et al. ................. 123/605
7,624,717 B2 * 12/2009 Inada et al. .............. 123/406.12
7,710,229 B2 * 5/2010 Inagaki .......................... 336/90
7,789,595 B2 * 9/2010 Tanaya ............................ 406/13
2007/0137628 A1 * 6/2007 Naruse et al. ................. 123/618
2010/0186715 A1 * 7/2010 Aida et al. ............... 123/406.28

FOREIGN PATENT DOCUMENTS

JP 63-150080 U 10/1988
JP 2001-50147 A 2/2001
JP 2002-004996 A 1/2002
JP 3753290 B2 3/2006

* cited by examiner

*Primary Examiner* — Freddie Kirkland, III
(74) *Attorney, Agent, or Firm* — Sughrue Mion, PLLC

(57) ABSTRACT

A combustion state detecting apparatus for an internal combustion engine includes: an ignition plug (2) for generating a spark discharge for igniting an air-fuel mixture in a combustion chamber; an ignition coil (1) for supplying a high voltage to cause the ignition plug (2) to generate the spark discharge; and an ECU (3) for feeding a driving signal for driving the ignition coil (1). An electromotive force (secondary voltage) due to electromagnetic induction when a primary current is caused to flow through a primary winding of the ignition coil (1) in response to the driving signal from the ECU (3) is applied to the ignition plug (2) to detect an ion current generated in the combustion chamber to detect a combustion state in the ignition plug based thereon.

5 Claims, 4 Drawing Sheets

COMBUSTION STATE DETECTING APPARATUS FOR INTERNAL COMBUSTION ENGINE

BACKGROUND OF THE INVENTION

1. Field of the Invention

The present invention relates to a combustion state detecting apparatus for an internal combustion engine, in particular, to a combustion state detecting apparatus for an internal combustion engine, which detects a change in the amount of ions generated at the time of combustion in the internal combustion engine to detect a combustion state in the internal combustion engine.

2. Description of the Related Art

Recently, environmental conservation and fuel exhaustion problems have been raised. Even for the automobile industry, a response to the above-mentioned problems is a big issue.

Although a large number of technologies for maximizing the efficiency of an internal combustion engine have been developed as countermeasures against the above-mentioned problems, it is necessary to know a combustion state to maximize the efficiency of the internal combustion engine. Therefore, there is a rapidly growing need for an apparatus capable of detecting the combustion state.

As a conventional apparatus capable of detecting the combustion state, for example, an apparatus described in JP 3753290 B (hereinafter, referred to as Patent Document 1) has been proposed. The apparatus described in Patent Document 1 detects ions generated according to the combustion in a combustion chamber in the form of current, and uses the detected ion current to determine the combustion state.

In order to detect the ion current, a high voltage is required to be applied to a detection probe provided in the combustion chamber. As means of generating the high voltage, a Zener diode and a capacitor are used.

As described in Patent Document 1, the Zener diode and the capacitor are connected to the low voltage side of a secondary winding of an ignition coil. However, since correspondingly large withstand voltage and capacity are required, the Zener diode and the capacitor become large in size as components. In addition, correspondingly high cost is required. Therefore, there is a problem in that the Zener diode and the capacitor prevent the size and cost of the apparatus from being reduced.

SUMMARY OF THE INVENTION

The present invention is devised in view of the above-mentioned problem, and has an object of providing a combustion state detecting apparatus for an internal combustion engine, which detects a combustion state with good accuracy at low cost and in compact size to enable an efficient operation of the internal combustion engine.

The present invention provides a combustion state detecting apparatus for an internal combustion engine, including: an ignition plug for generating a spark discharge for igniting an air-fuel mixture in a combustion chamber; an ignition coil for supplying a high voltage to cause the ignition plug to generate the spark discharge; ignition control means for feeding a driving signal for driving the ignition coil; ion current detection means for detecting an ion current generated in the combustion chamber; and combustion state detection means for detecting a combustion state in the ignition plug based on a detected value of the ion current, in which an electromotive force generated in a secondary winding of the ignition coil due to electromagnetic induction when a primary current is caused to flow through a primary winding of the ignition coil in response to the driving signal fed to the ignition coil is applied to the ignition plug to detect the ion current generated in the combustion chamber to detect the combustion state in the ignition plug based on the detected value of the ion current.

By providing the combustion state detecting apparatus for an internal combustion engine, including: the ignition plug for generating a spark discharge for igniting the air-fuel mixture in the combustion chamber; the ignition coil for supplying a high voltage to cause the ignition plug to generate the spark discharge; the ignition control means for feeding the driving signal for driving the ignition coil; the ion current detection means for detecting an ion current generated in the combustion chamber; and the combustion state detection means for detecting a combustion state in the ignition plug based on the detected value of the ion current, an electromotive force generated in the secondary winding of the ignition coil due to electromagnetic induction when a primary current is caused to flow through the primary winding of the ignition coil in response to the driving signal fed to the ignition coil being applied to the ignition plug to detect the ion current generated in the combustion chamber to detect the combustion state in the ignition plug based on the detected value of the ion current, the present invention enables the combustion state to be detected with good accuracy at low cost and in compact size and enables an efficient operation of the internal combustion engine.

DETAILED DESCRIPTION OF THE PREFERRED EMBODIMENT

Hereinafter, a preferred embodiment of the present invention is described.

Embodiment 1

Figure 1:
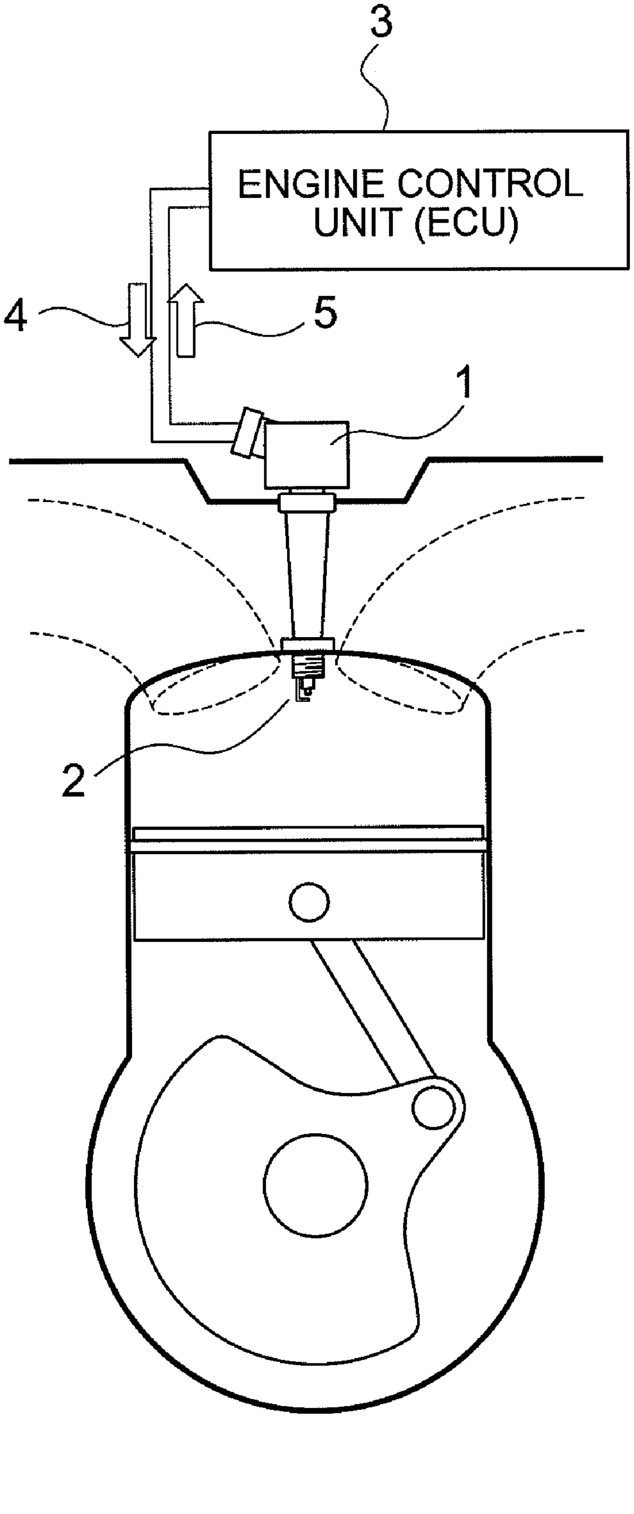
FIG. 1 is a configuration diagram of a combustion state detecting apparatus for an internal combustion engine according to a first embodiment of the present invention.

FIG. 1 is a view illustrating an example of an overall configuration of a combustion state detecting apparatus for an internal combustion engine according to Embodiment 1 of the present invention. In FIG. 1, the combustion state detecting apparatus includes an ignition coil 1, an ignition plug 2, and an engine control unit (hereinafter, abbreviated as an ECU) 3. The ignition coil 1 supplies a high voltage to the ignition plug 2. The ignition plug 2 generates a spark discharge for igniting an air-fuel mixture in a combustion chamber with the high voltage supplied from the ignition coil 1. The ECU 3 feeds a signal for driving the ignition coil 1 to control the internal combustion engine (hereinafter, also referred to as an engine). FIG. 1 also illustrates a path 4 through which an energization signal is transmitted from the ECU 3 to the ignition coil 1, and a path 5 through which an ion current flows from the ignition plug 2 to the ECU 3.

In the configuration illustrated in FIG. 1, the ignition coil 1 is a device for generating the high voltage for causing the ignition plug 2 to generate the spark discharge for igniting the air-fuel mixture in the combustion chamber. In addition to the function of generating the high voltage, the ignition coil 1 includes a device for generating a voltage for detecting the ion current and a device for amplifying the detected ion current and outputting the amplified ion current (an amplifier circuit 24).

The ignition plug 2 is a device for generating the spark discharge for igniting the air-fuel mixture in the combustion chamber. In addition to the function of generating the spark discharge, the ignition plug 2 has a role of a detection probe for detecting the ion current (ion current detection means).

Figure 4:
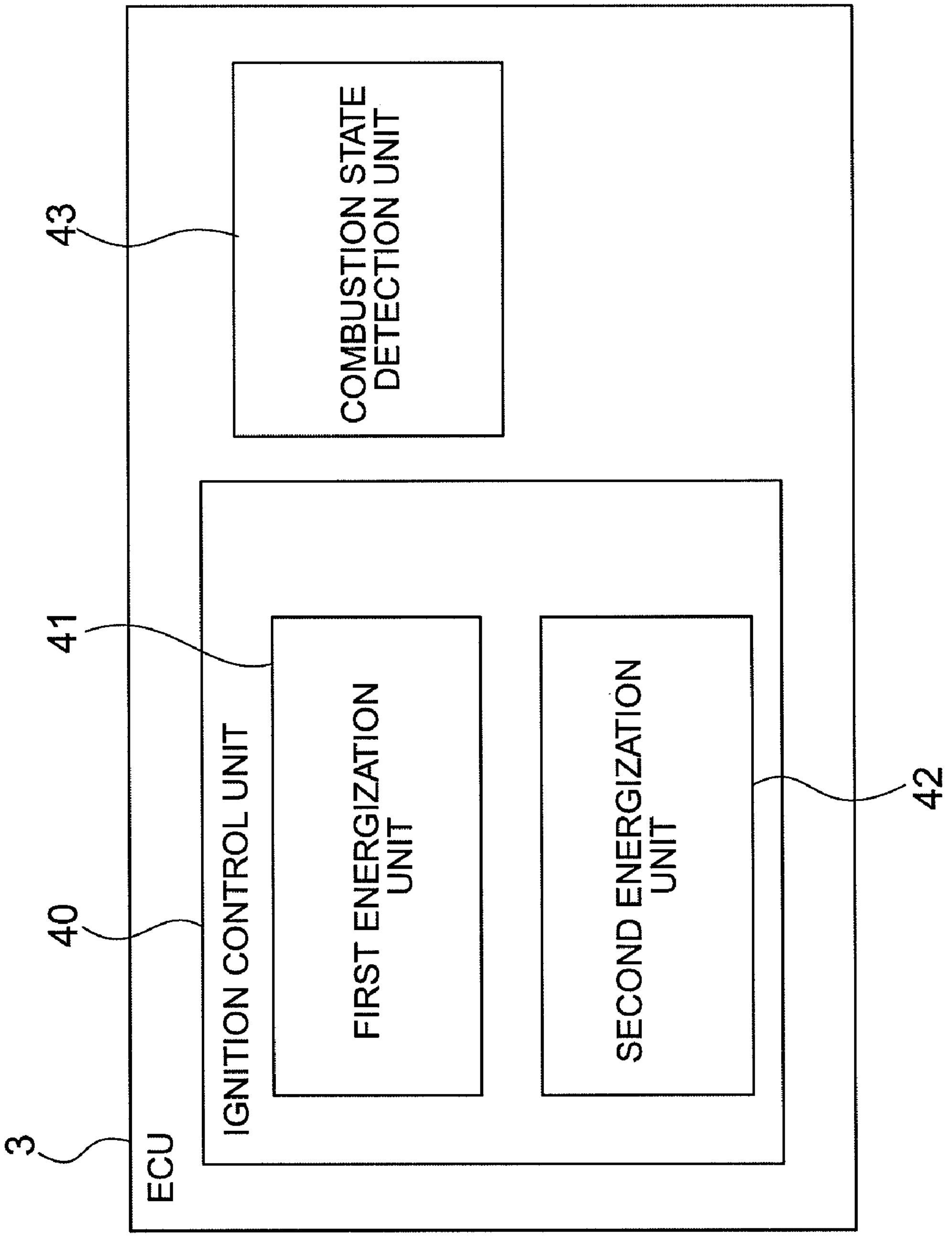
FIG. 4 is a block diagram illustrating an internal configuration of an engine control unit provided in the combustion state detecting apparatus for the internal combustion engine according to the first embodiment of the present invention.

As illustrated in FIG. 4, the ECU 3 includes ignition control unit 40 for feeding the signal for driving the ignition coil 1 to be in charge of the control of the engine. In addition, the ECU 3 also includes combustion state detection unit 43 for processing the ion current signal indicating a change in the amount of ions generated at the time of combustion in the internal combustion engine to determine a combustion state in the ignition plug 2. The ignition control unit 40 includes first energization unit 41 for feeding a first energization signal for igniting the air-fuel mixture in the combustion chamber and second energization unit 42 for feeding a second energization signal for detecting the ion current in the combustion chamber, as driving signals for the ignition coil 1.

Figure 2:
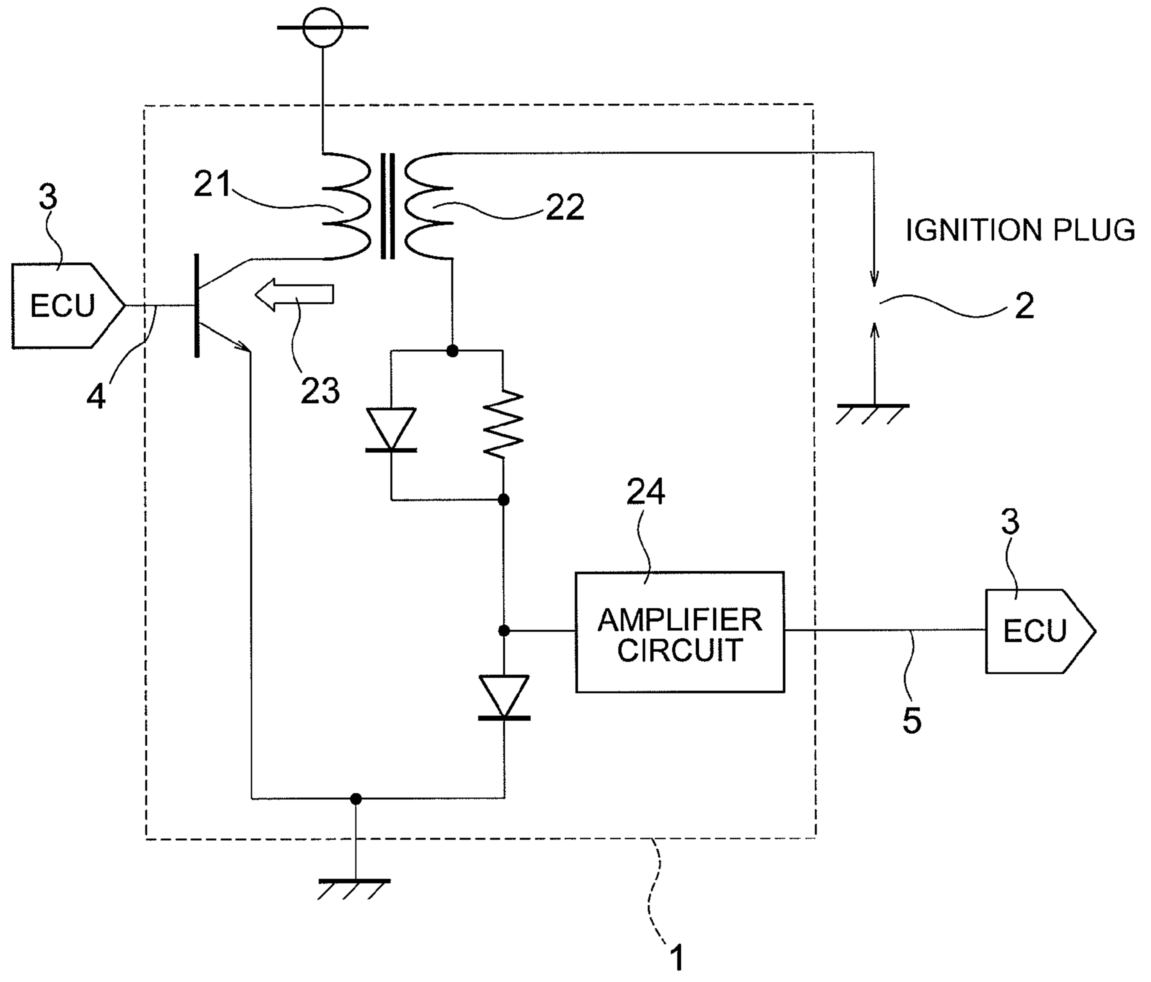
FIG. 2 is a circuit diagram of the combustion state detecting apparatus for the internal combustion engine according to the first embodiment of the present invention.

FIG. 2 is a view illustrating an example of an apparatus circuit in the combustion state detecting apparatus for the internal combustion engine according to the Embodiment 1 of the present invention. FIG. 2 illustrates a primary wiring 21 in the ignition coil 1, a secondary wiring 22 in the ignition coil 1, a primary current 23 flowing through the primary wiring 21, and the amplifier circuit 24. Since the reference numerals 1 to 5 denote the same components as those of the configuration illustrated in FIG. 1, those components are denoted by the same reference numerals, and the description thereof is omitted here. Although a plurality of the ECUs 3 are illustrated in FIG. 2, these are illustrated for illustrating a flow of the signal in FIG. 2 in an easily comprehensive and simple manner. It is apparent that the single ECU 3 is actually provided.

An operation of the combustion state detecting apparatus for the internal combustion engine according to the Embodiment 1 of the present invention is described referring to the circuit diagram of FIG. 2.

When the energization signal is fed from the ECU 3 to the ignition coil 1 through the path 4, the primary current 23 flows through the primary winding 21 in the ignition coil 1. In response to the flow of the primary current 23, a secondary voltage due to electromagnetic induction is generated in the second winding 22 in the ignition coil 1.

Next, the secondary voltage is applied to an electrode of the ignition plug 2. At this time, if ions are generated by a discharge from the ignition plug 2 and there are the ions in the vicinity of the electrode of the ignition plug 2, the ion current containing the ions is detected in the ignition plug 2. The detected ion current signal is input to the amplifier circuit 24 through the secondary winding 22 to be amplified. The amplified ion current signal is transmitted to the ECU 3 through the path 5. The ECU 3 determines a state of combustion in the combustion chamber based on the transmitted ion current signal. More specifically, the ECU 3 compares a value of the ion current signal and a predetermined threshold value for ion current detection (see a threshold value 301 for ion current detection illustrated in FIG. 3) to detect the state of combustion.

Figure 3:
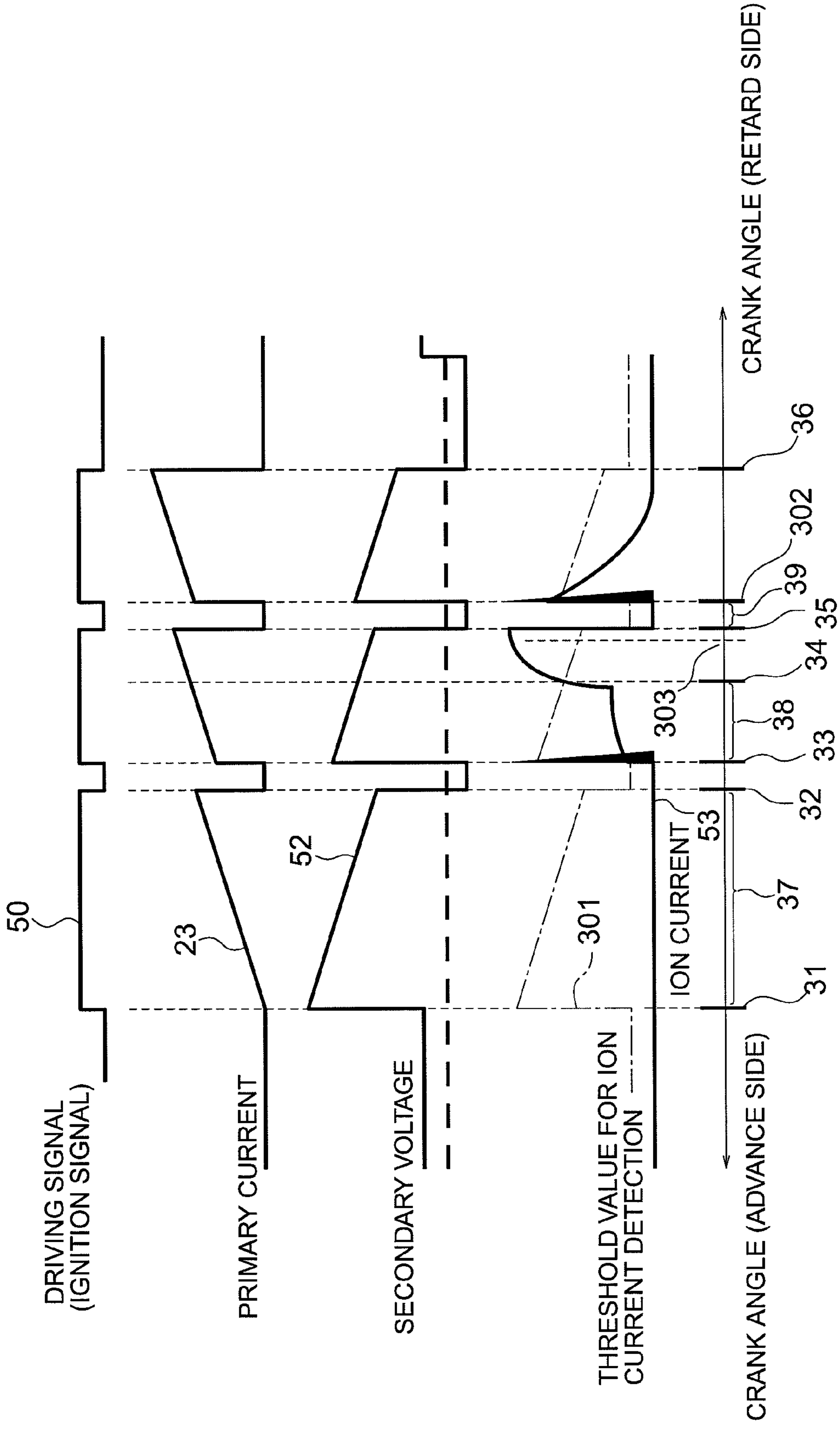
FIG. 3 is a timing chart of signals in the combustion state detecting apparatus for the internal combustion engine according to the first embodiment of the present invention.

A method for detecting the ion current is described referring to a timing chart of FIG. 3. FIG. 3 illustrates a driving signal (ignition signal) 50 fed from the ECU 3 to the ignition coil 1, a primary current 23 flowing through the primary winding 21, which is illustrated in FIG. 2, a secondary voltage 52 to be applied to the ignition plug 2, and an ion current 53.

In the example illustrated in FIG. 3, for the purpose of igniting the air-fuel mixture in the combustion chamber at timing 31 at a predetermined crank angle (hereinafter, timing at a predetermined crank angle is referred to as crank angle timing), the first energization of the ignition coil 1 is started by the first energization unit 41 of the ECU 3 (the first energization signal). The secondary voltage 52 suddenly increases at the crank angle timing 31 as illustrated in FIG. 3. Therefore, the ion current can be detected after the timing 31. However, the combustion does not generally occur in the combustion chamber yet at the timing 31, and therefore, the ions are not generated. Specifically, a value of the ion current 53 is zero at this timing 31, as illustrated in FIG. 3.

From the crank angle timing 31 to crank angle timing 32, the secondary voltage gradually drops as illustrated in FIG. 3.

When the first energization of the ignition coil 1 (the first energization signal) is intercepted by the first energization unit 41 of the ECU 3 at the preset crank angle timing 32, the large secondary voltage is generated on the negative side to generate the spark discharge at the electrode of the ignition plug 2. Here, it should be noted that this first spark discharge mainly serves to ignite the fuel in the combustion chamber. During the spark discharge, the voltage on the negative side is applied to the electrode of the ignition plug 2. Therefore, the ion current cannot be detected.

Note that the first energization unit 41 determines this first energization time period (time period for feeding the energization signal) 37, that is, a time period from the crank angle timing 31 to the crank angle timing 32 for each operating condition.

Next, at crank angle timing 33, the second energization of the ignition coil 1 is started by the second energization unit 42 of the ECU 3 (a second energization signal) for the purpose of detecting the ion current in the combustion chamber for this time. As a result, the secondary voltage due to the electromagnetic induction is applied to the ignition plug 2. Therefore, the ion current 53 generated in a time period 38 from the crank angle timing 33 to the crank angle timing 34 can be detected.

The timing of starting the second energization (specifically, the crank angle timing 33) is set for each operating condition to be almost equal to a minimum value of the spark discharge time period, which allows combustibility to be ensured.

However, if an interval between the interception of the first energization (specifically, the crank angle timing 32) and the start of the second energization (specifically, the crank angle timing 33) becomes too short, the secondary voltage due to the electromagnetic induction becomes small in some cases. In such a case, the voltage high enough to detect the ion current cannot be supplied. Therefore, a lower limit threshold value is set for the interval, and the interval is set to a value larger than the lower limit threshold value. As described above, preferably, the second energization unit 42 starts feeding the second energization signal after the predetermined time period set for each operating condition from the end of the feeding of the first energization signal by the first energization unit 41.

Alternatively, under an operating condition in which a required discharge time period is short, the first energization time period is set shorter. As a result, even if the interval between the interception of the first energization (crank angle timing 32) and the start of the second energization (crank angle timing 33) is short, the secondary voltage due to the electromagnetic induction can be prevented from being reduced. Therefore, the detectability of the ion current can be maintained.

In order to improve the detection accuracy of the ion current, it is necessary to apply the sufficiently high secondary voltage to the ignition plug 2. In Embodiment 1, the secondary voltage of about 100V is supposed to be necessary for ensuring detection accuracy.

Since the secondary voltage gradually drops after the crank angle timing 33 as illustrated in FIG. 3, the secondary energization unit 42 of the ECU 3 intercepts the second energization (the second energization signal) at crank angle timing 35 before the secondary voltage fully drops. Then, if necessary, the third energization is carried out at crank angle timing 302. Note that, this third energization in this case is also the energization of the ignition coil 1 (the second energization signal) by the second energization unit 42 of the ECU 3 for the purpose of detecting the ion current in the combustion chamber, similar to the case of the second energization. As described above, the energization of the ignition coil 1 for the purpose of detecting the ion current in the combustion chamber is performed at least once, and the number of times of energization (number of times of feeding the energization signal) is appropriately determined as needed.

Here, if the ignition operation with the short spark discharge period is repeated, a value of the primary current 23 gradually increases as illustrated in FIG. 3. The ignition coil 1 includes a primary current restricting function for restricting an upper limit of the primary current 23 to protect the ignition coil 1 in some cases. When the primary current restricting function is provided, the value of the primary current 23 ultimately becomes constant at the limit value set for the primary current restricting function. When the value of the primary current 23 becomes constant, the secondary voltage due to the electromagnetic induction is not generated. Therefore, the ion current 53 can no longer be detected. Accordingly, the energization time period and the discharge time period of the ignition coil 1 are appropriately set to prevent the primary current 23 from being increased up to the limit value. Alternatively, the primary current restricting function is removed. Further alternatively, the primary current limit value is set as high as possible within the range where the ignition coil 1 can be protected. In Embodiment 1, about 14V is supposed as the primary current limit value. As described above, it is desired that the ignition coil 1 does not limit the primary current flowing through the primary winding 21.

The secondary voltage generated in the secondary winding 22 of the ignition coil 1 due to the electromagnetic induction when the primary current 23 is caused to flow through the primary winding 21 of the ignition coil 1 in response to the signal fed to the ignition coil 1 from the secondary energization unit 42 of the ECU 3 is applied to the ignition plug 2 in the above-mentioned manner. As a result, the amount of change in the ion current 53 is detected in the ignition plug 2. The detected ion current 53 is amplified by the amplifier circuit 24, and is then transmitted to the combustion state detection unit 43 of the ECU 3. The combustion state detection unit 43 of the ECU 3 determines the state of combustion in the combustion chamber based on a value of the ion current 53. More specifically, the combustion state detection unit 43 compares the value of the ion current 53 and the threshold value 301 for ion current detection with each other to detect the state of combustion.

As described above, in Embodiment 1, the combustion state detecting apparatus for the internal combustion engine includes: the ignition plug 2 for generating the spark discharge for igniting the air-fuel mixture in the combustion chamber and for detecting the ion current generated in the combustion chamber; the ignition coil 1 for supplying the high voltage for causing the ignition plug 2 to generate the spark discharge; and the ECU 3 for feeding the driving signal for driving the ignition coil 1 and for detecting the combustion state in the ignition plug 2 based on the detected value of the ion current. In the combustion state detecting apparatus, the electromotive force (secondary voltage) generated in the secondary winding 22 of the ignition coil 1 due to the electromagnetic induction when the primary current is caused to flow through the primary winding 21 of the ignition coil 1 in response to the signal fed to the ignition coil 1 is applied to the ignition plug 2 to detect the ion current generated in the combustion chamber to detect the combustion state in the ignition plug 2 based on the detected value of the ion current. Thus, the number of components in the apparatus for detecting the ion current can be reduced as compared with that in the conventional apparatuses. The apparatus can be configured to have compact size at low cost and detect the combustion state at good accuracy. As a result, the internal combustion engine can be efficiently operated to enable the maximization of efficiency of the internal combustion engine, which in turn provides the effects in that the apparatus can be used to cope with the fuel exhaustion problem and environmental conservation.

Moreover, the ignition control unit 40 provided in the ECU 3 includes: the first energization unit 41 for feeding the first energization signal for igniting the air-fuel mixture in the combustion chamber to the ignition coil 1; and the second energization unit 42 for feeding the second energization signal for detecting the ion current in the combustion chamber to the ignition coil 1. Since the second energization unit 42 feeds the second energization signal for detecting the ion current at least once, the ion current can be easily detected for an arbitrary number of times, thereby improving the detection accuracy.

The combustion state detecting apparatus according to the present invention is mounted in an automobile, a two-wheel vehicle, an outboard engine, and other special machines, which use the internal combustion engine, to enable the efficient operation of the internal combustion engine, and is used for coping with the fuel exhaustion problem and environmental conservation.

What is claimed is:

1. A combustion state detecting apparatus for an internal combustion engine, comprising:

an ignition plug for generating a spark discharge for igniting an air-fuel mixture in a combustion chamber;

an ignition coil for supplying a high voltage to cause the ignition plug to generate the spark discharge;

ignition control means for feeding a driving signal for driving the ignition coil;

ion current detection means for detecting an ion current generated in the combustion chamber; and combustion state detection means for detecting a combustion state in the ignition plug based on a detected value of the ion current, wherein an electromotive force generated in a secondary winding of the ignition coil due to electromagnetic induction when a primary current is caused to flow through a primary winding of the ignition coil in response to the driving signal fed to the ignition coil is applied to the ignition plug to detect the ion current generated in the combustion chamber to detect the combustion state in the ignition plug based on the detected value of the ion current, wherein the ignition control means provides the driving signal when the ion current is generated.

2. A combustion state detecting apparatus for an internal combustion engine according to claim 1, wherein the ignition coil does not restrict the primary current flowing through the primary winding.

3. A combustion state detecting apparatus for an internal combustion engine, comprising:

an ignition plug for generating a spark discharge for igniting an air-fuel mixture in a combustion chamber;

an ignition coil for supplying a high voltage to cause the ignition plug to generate the spark discharge;

ignition control means for feeding a driving signal for driving the ignition coil;

ion current detection means for detecting an ion current generated in the combustion chamber; and combustion state detection means for detecting a combustion state in the ignition plug based on a detected value of the ion current, wherein an electromotive force generated in a secondary winding of the ignition coil due to electromagnetic induction when a primary current is caused to flow through a primary winding of the ignition coil in response to the driving signal fed to the ignition coil is applied to the ignition plug to detect the ion current generated in the combustion chamber to detect the combustion state in the ignition plug based on the detected value of the ion current, wherein:

the ignition control means comprises:

first energization means for feeding a first energization signal for igniting the air-fuel mixture in the combustion chamber to the ignition coil as the driving signal; and second energization means for feeding a second energization signal for detecting the ion current in the combustion chamber to the ignition coil as the driving signal; and the second energization means feeds the second energization signal for detecting the ion current at least once.

4. A combustion state detecting apparatus for an internal combustion engine according to claim 3, wherein the second energization means starts feeding the second energization signal after elapse of a predetermined time period set for each operating condition from end of feeding of the first energization signal by the first energization means.

5. A combustion state detecting apparatus for an internal combustion engine according to claim 3, wherein the first energization means sets a time period for feeding the first energization signal, for each operating condition.

* * * * *